(12) United States Patent
Boscha (10) Patent No.: US 6,419,405 B1
(45) Date of Patent: Jul. 16, 2002

(54) OPTICAL FIBER/OPTICAL COMPONENT ASSEMBLY

(76) Inventor: Bogie Boscha, 101 Hillside Ave., Metuchen, NJ (US) 08840

(*) Notice: Subject to any disclaimer, the term of this patent is extended or adjusted under 35 U.S.C. 154(b) by 0 days.

(21) Appl. No.: 09/695,660

(22) Filed: Oct. 25, 2000

(51) Int. Cl.[7] ................................................ G02B 6/36
(52) U.S. Cl. ............................ 385/93; 385/33; 385/92; 385/137
(58) Field of Search .............................. 385/33, 34, 35, 385/52, 79, 92, 93, 137

(56) References Cited

U.S. PATENT DOCUMENTS

| | | |
|---|---|---|
| 3,950,075 A | 4/1976 | Cook et al. |
| 4,102,559 A | 7/1978 | Hunzinger |
| 4,147,402 A | 4/1979 | Chown |
| 4,183,618 A | 1/1980 | Rush et al. |
| 4,327,963 A | 5/1982 | Knoe et al. |
| 4,810,053 A | 3/1989 | Woith |
| 6,179,483 B1 * | 1/2001 | Kanazawa ............... 385/93 |
| 6,253,005 B1 * | 6/2001 | Bergmann et al. ........ 385/33 |

FOREIGN PATENT DOCUMENTS

| | | |
|---|---|---|
| JP | 1017354 | 1/1966 |
| JP | 1429843 | 3/1976 |
| JP | 2327278 | 1/1991 |

* cited by examiner

Primary Examiner—Hung Xuan Dang
Assistant Examiner—Tuyen Tra
(74) Attorney, Agent, or Firm—I. Zborovsky (57) ABSTRACT

An assembly for coupling an optical fiber to an optical component, e.g., an axisymmetric light source such as an axisymmetric laser diode, comprises a light source connected to an optical fiber ferrule via a focusing component in the form of a micro lens element. This element is made in the form of a plate having one end face flat and the opposite end with an circular microlens. The microlens is inserted into the central opening of the ferrule and is glued to the end face of the ferrule with a UV-curable optically matched glue. An essential part of the invention is that all parts of the coupling are made from a material with the same or close coefficient of thermal expansion, and that an assembling procedure ensures optimal coupling (without losses) of the light source to the fiber due to high quality of the aspheric lens and due to a specific sequence of operations in assembling. The construction of the coupler is suitable for mass production by forming an array of microlenses, aligned with fibers in a fiber matrix, and fiber locking matrix that fixes individual fibers of the bundle in optically matched positions. The alignment is ensured due to simultaneous packaged manufacturing of the lenses and holes in the fiber matrix and the locking matrix. Other embodiments relate to coupling between two multiple-fiber ports and to a device for switching between the fibers.

46 Claims, 8 Drawing Sheets

OPTICAL FIBER/OPTICAL COMPONENT ASSEMBLY

FIELD OF THE INVENTION

The present invention relates to the field of fiber optics, particularly to an optical fiber/optical component assembly. The invention may find use in systems of data transmission via fiber optics channels, as well as in optical sensors based on the use of optical fibers, etc. The invention also relates to a method of manufacturing and assembling the aforementioned assembly.

BACKGROUND OF THE INVENTION

In the field of fiber optical communication, an assembly of an optical fiber with an optical component is normally carried out through a coupler between an optical fiber used for transmission of optical signals and an optical system component, such as a light source, e.g., a laser diode. Such a coupler is an important part of the optical system. However, it should satisfy a number of technical requirements such as simplicity of manufacturing, assembling, and alignment procedures under mass production conditions.

In the past, several techniques have been utilized to align the optical fiber to the lens both in a longitudinal and transverse direction. Each of the techniques employed one of a plurality of lens contacts for terminating the optical fiber. A first of these techniques teaches that the lens contact is terminated by micropositioning a "pigtailed" optical fiber, that is, the fiber which is back illuminated and optimized in position. The optimized position of the fiber is accomplished by projecting the back illumination of the fiber through the lens to a target on a screen. When the back illumination through the lens strikes the target on the screen, the fiber is bonded securely and thus optimized in position with the fiber end face interfacing the focal point of the lens. A second of these alignment techniques involves providing a cylindrical hole behind the lens. The cylindrical hole is aligned along the optical axis of the lens and is blind ended at the focal point of the lens. Also, the cylindrical hole has a diameter that accommodates the optical fiber with a close fit, and the optical fiber is bonded within the cylindrical hole with an index of refraction matched adhesive.

The process of aligning the optical fiber to the lens requires achieving both forward alignment and lateral alignment of the optical fiber, which is usually a problem. In the first technique, the problem manifests itself in the tedious requirement of adjusting the optical fiber to a stringent tolerance to permit the back illumination through the lens to strike the target. A second problem that exists concerns the necessary use of an epoxy to affix the optical fiber to the lens. In the back illumination method, epoxy is required to securely bond the fiber to the lens. In the second technique of alignment utilizing the cylindrical hole in the lens, the epoxy produces a hydraulic effect when the fiber is inserted into the cylindrical hole. The epoxy which is an index of refraction matched adhesive creates a hydraulic force that prevents the fiber end face from reaching the focal point of the lens. This problem results in a loss of or attenuation of the optical signal.

Several prior-art references which are relevant to the instant invention have been discovered and will be discussed briefly.

British Pat. No. 1,017,354 issued to Contina discloses a system in which light is transmitted from one element to another so that the difference in cross-sections between the elements can be effected within a very short distance without loss of intensity. An optical system comprised of two bundles of optical fibers is arranged with one end of a first bundle facing one end of a second bundle and spaced apart therefrom. The ends of the two bundles are of different areas and a transparent body optically couples the two ends together. The transparent body has a reflecting surface, which is substantially ellipsoidal in shape and coaxial with the bundle ends. Light rays of the optical signal are reflected such that they pass through a focal point in an axial end face of the second bundle.

British Pat. No. 1,429,843 issued to Kahn discloses a coupling unit consisting of a first housing member and a second housing member, each carrying an end region of one of two light guides. The first housing member has a first coupling formed to fit into a second coupling of the second housing member. The first light guide is held centrally in the first coupling by a first body, and the second light guide is held centrally in the second coupling by a second body. During manufacture, the ends of the light guides may be polished with the faces of the first and second bodies. A lens is mounted between the ends of the two light guides. Accurate alignment between the lens and the light guide is required.

U.S. Pat. No. 3,950,075 issued to Cook, et al. discloses an optical communication system which includes a diode for emitting optical wave energy to be coupled to an optical waveguide bundle. A transparent spherical bead is axially aligned with the bundle and the center of the light emitting area of the diode. The bead is securely mounted in an aperture, which extends through one end of an insert within a housing. Precise alignment of the center of the bead along the axis of the aperture results from a force fit. The diode is disposed in the housing for proper alignment of the light emitting area of the diode with the bead. The end of the bundle is disposed in a termination ferrule having an aperture, the bundle being potted in the ferrule by a bonding material. The ferrule maintains the fiber bundle in a substantially parallel alignment. A problem is the high tolerance alignment required between the diode, the bead, and the bundle.

U.S. Pat. No. 4,102,559 issued to Hunzinger discloses an optical structure comprising two very thick piano-convex lenses with a common axis. The convex surfaces of the lenses face each other while a radiation source and an input face of a fiber are each disposed on one of the convex surfaces in the vicinity of the axis. The main feature of the device resides in the considerable thickness of the lenses relative to the radii of curvature of the dioptric faces. As a result, aberrations, in particular spherical aberrations, are reduced while the dimensions of the device are such as to enable easy construction and handling.

U.S. Pat. No. 4,147,402 issued to Chown discloses a process for manufacturing a lens termination for an optical fiber using laser machining to form a cavity, which centers the fiber in the termination. A plastic preform is provided comprising a tube member with a coaxial bore having one end closed by a lens at least the rearward portion of which comprises a plastic material. The bore and lens are arranged such that the base of the bore lies in the focal plane of the lens. Light is directed from a laser through the lens so as to focus the light onto the base of the bore thus evaporating a portion of the plastic material to form a cavity which, when the termination is in use, receives the bared end of a coated optical fiber. An index-matching adhesive is used to bond the fiber within the cavity which produces the previously described hydraulic force preventing the fiber end face from reaching the focal plane of the lens, U.S. Pat. No. 4,183,618 issued to Rush et al. discloses an optical waveguide including a connector having a longitudinal bore in which an end of an optical waveguide is to be anchored, lens means for transmitting light from one end of the waveguide and defining a recess including a focal point of the lens means, and a housing in which the connector and lens means are mounted. The terminal also includes an elongate optical member having first and second ends with respective end faces, the first end of the elongate optical member extending partially through the connector and being anchored therein, and the second end of the elongate optical member being mounted in the recess in the lens means with its end face disposed at the focal point of the lens means. The connector includes means for maintaining the first end of the optical member and an end of an optical waveguide in alignment with one another.

U.S. Pat. No. 4,327,963 issued to Knoe et al. discloses a coupling element for an optical transmission system having a coupling element comprised of a convex lens with a refractive index. The refractive index is dependent on a radius "r" of a shell in the lens. The coupling element further includes a holder through which a capillary extends. The convex lens, which is spherical, is affixed to an end of an optical fiber with the lens-fiber interface being enclosed within the capillary. The capillary is preferably circular cylindrical in shape and may rest in a V-shaped groove of a holder. A transparent coupling medium may be disposed between the lens and the fiber for light refraction purposes.

As can be seen from the description of the prior-art devices given above, a problem associated with tedious axial and lateral alignments in connection of the fibers to optical components or to each other still exists. Furthermore, in some prior-art devices the fixation of the fiber in the adjusted or aligned position is performed with the use of a glue in a blind hole, whereby the glue in a liquid state produces a hydraulic effect which makes it difficult to ensure final accurate positioning of the parts being interconnected. Moreover, none of the prior-art devices is suitable for mass production, as they require individual sequential alignment of each single fiber in assembling of optical fiber couplers.

U.S. Pat. No. 4,810,053 issued to Woith in 1989 relates to an alignment and retention device for optical transmission fibers having an optical lens with a forwardly directed curved surface molded to a rearward extension. The extension has an upper portion and a lower portion separated by a V-shaped gap, each portion having a longitudinally extending V-shaped groove for aligning and supporting an optical fiber. The lens and rearward extension are fashioned from a single piece of plastic with an abutment means comprised of a vertical stop at an interface therebetween. A focal point of the lens is located at the abutment means, and a retention means securely retains the optical lens while a clamping means surrounds the retention means forcing the upper and lower portions together for capturing the optical fiber within the V-shaped gap providing forward and lateral fiber alignment without using an index matching adhesive.

Although the device of U.S. Pat. No. 4,810,053 does not use an adhesive, it is extremely complicated in construction, has many miniature parts of complex shapes, involves time-consuming and multiple-step assembling, and is not suitable for mass production.

Figure 1:
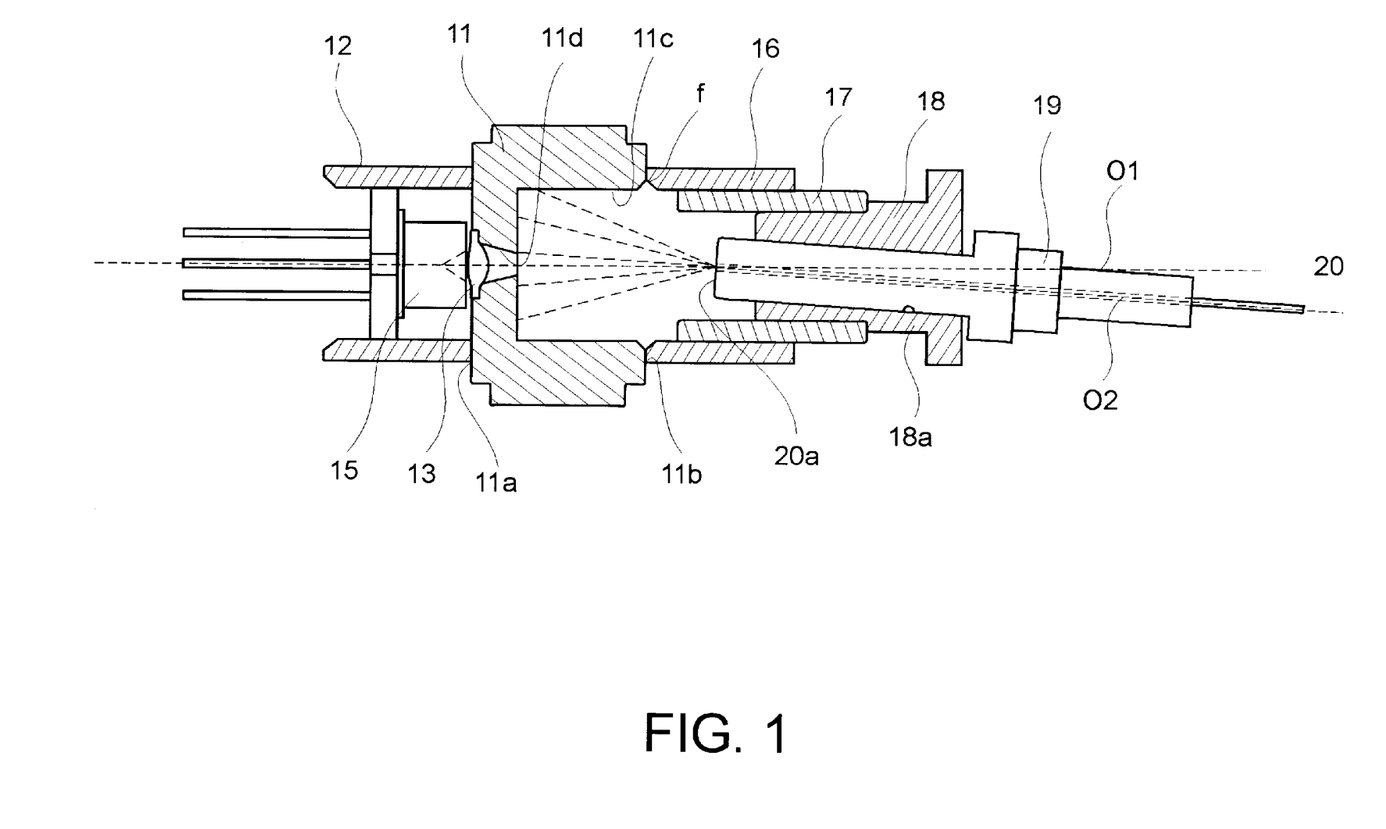
FIG. 1 is longitudinal sectional view of a known optical fiber/optical component assembly.

GB Patent 2,327,278 issued to Hiroshi Kanazawa discloses an optical fiber/laser diode assembly with a coupler between the fiber and the laser diode. The assembly is shown in FIG. 1. It has a laser diode 12 attached to a lens holder 11 that retains a coupling lens 13. The holder 11 is attached to an adjusting ring 16 for use in optical fiber multiport couplers.

Pending U.S. patent application Ser. No. 658619 filed by the same applicant in 2000 discloses an optical fiber coupler which is suitable for mass production due to self-alignment of optical elements during assembling and due to the butt connection of the end of the fiber with a flat end face of the lens element used as a reference surface. The axial and lateral alignment is achieved due to the manufacturing procedure that ensures strict planarity and parallelism of the mating end faces of the components, so that optical alignment is provided automatically as a result of assembling of the components into an integral coupling unit. However, the construction described in the aforementioned U.S. patent application relates to complicated optical systems with anamorphotic lenses the use of which is justified when a light source, such as a laser diode of the type, that has an essential difference in radiation characteristics in two mutually perpendicular axes (fast axis and slow axis), is used.

It is obvious that in coupling an optical fiber to a light source with distribution of light close to symmetrical, it would be more advantageous to use coupling structures less complicated than those described in the aforementioned U.S. patent application.

OBJECT OF THE INVENTION

It is an object of the present invention to provide an optical fiber/optical component assembly with a coupler for coupling an optical fiber to an optical component, which is simple in construction, easy to align in assembling under conditions of mass production, and is suitable for use in optical fiber multiport couplers. Another object is to provide a method of manufacturing and assembling an optical fiber/optical component assembly, which is simple in construction and is suitable for mass production.

SUMMARY OF THE INVENTION

An assembly for coupling an optical fiber to an optical component, e.g., an axisymmetric light source such as an axisymmetric laser diode, comprises a light source connected to an optical fiber ferrule via a focusing component in the form of a micro lens element. This element is made in the form of a plate having one end face flat and the opposite end with an aspheric circular microlens. The microlens is inserted into the central opening of the ferrule and is glued to the end face of the ferrule with a UV-curable optically matched glue. An essential part of the invention is that all parts of the coupling are made from a material with the same or close coefficient of thermal expansion, and that an assembling procedure ensures optimal coupling (without losses) of the light source to the fiber due to high quality of the aspheric lens and due to a specific sequence of operations in assembling. The construction of the coupler is suitable for mass production by forming an array of microlenses, aligned with fibers in a fiber matrix, and fiber locking matrix that fixes individual fibers of the bundle in optically matched positions. The alignment is ensured due to simultaneous packaged manufacturing of the lenses and holes in the fiber matrix and the locking matrix. Other embodiments relate to coupling between two multiple-fiber ports and to a device for switching between the fibers.

DETAILED DESCRIPTION OF THE INVENTION

Figure 2A:
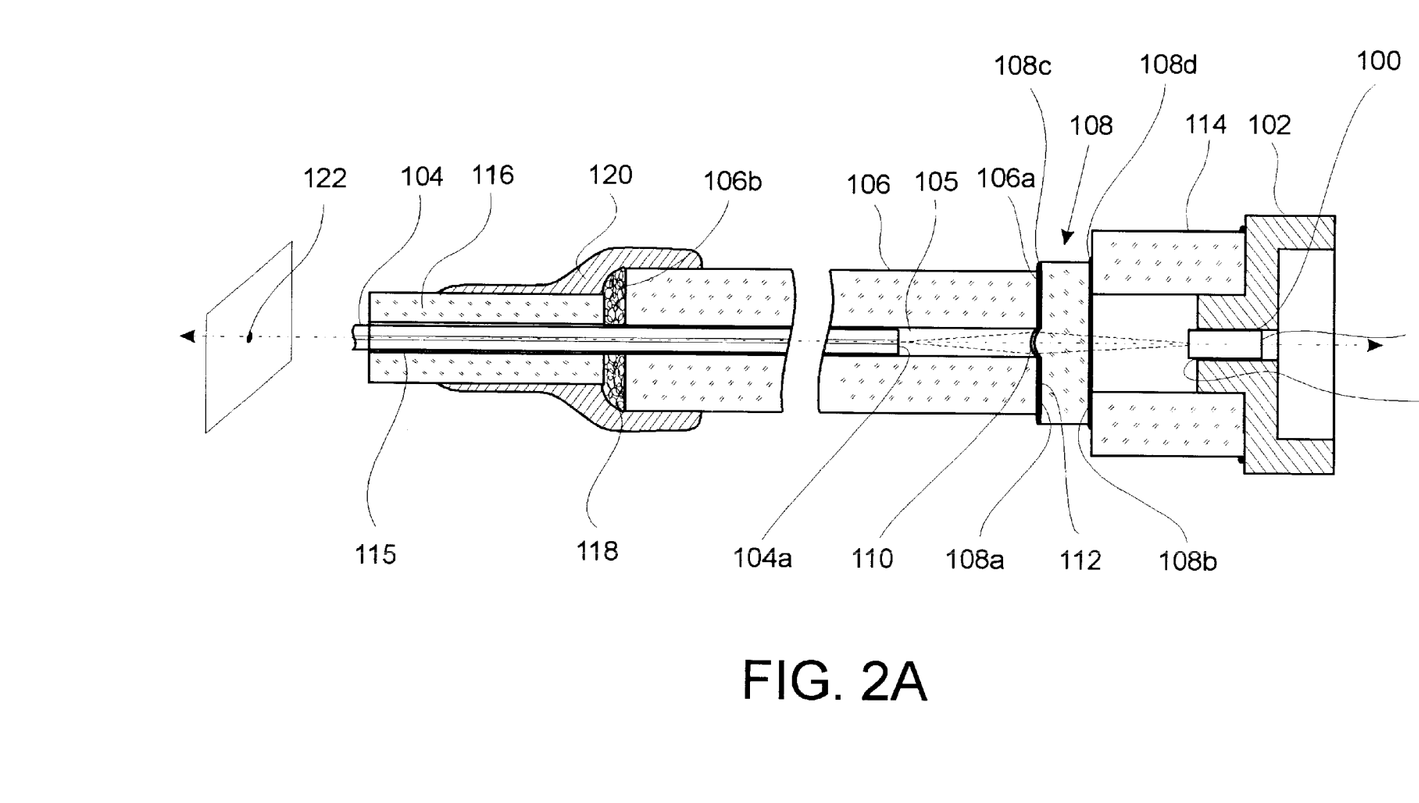
FIG. 2A is a longitudinal sectional view of an optical fiber/laser diode assembly of the invention.

FIG. 2A—Laser to Fiber Coupling Assembly

An optical fiber/laser diode assembly of the invention is shown in FIG. 2A, which is a longitudinal sectional view of the device in accordance with one embodiment of the invention. Optical matching between the light-emitting optical component, i.e., an axisymmetric laser diode and a light-transmitting optical fiber is carried out with the use of an optical coupler. The purpose of the coupler is to match the aforementioned components for transmitting light with minimal optical losses. In this drawing, reference numeral 100 designates a light source, e.g., a laser diode with a substantially axisymmetric radiation. The laser diode 100 is secured in a light-source holder 102 made, e.g., of a metal, or any other material with good heat-removal properties for removing heat from the laser diode. An optical fiber 104, which has to receive light from the laser diode 100, is inserted with a tight sliding fit into the central opening 105 of a glass, quartz, or ceramic tube or ferrule 106. The front end face 106a of the ferrule is strictly perpendicular to the longitudinal axis X—X of the ferrule 106. A plate optical lens element 108 having a circular aspheric lens 110 is attached, e.g., by a layer 112 of a UV-cured glue, to the end face 106a of the ferrule. The base diameter of the lens 110 is equal to the diameter of the central opening 105 of the ferrule, so that the lens 110 is snugly fit into the opening 105. The front side 108a (except for the area occupied by the lens 110) and the back side 108b of the lens element 108 are polished to a high degree of surface finishing and are strictly parallel to each other and to the end face of the ferrule 106a.

It is important to note that the lens 110 and the back side 108b of the lens element are coated with antireflective coating layers 108c and 108d, respectively.

The unit consisting of the ferrule 106 with the fiber 104 and the lens element 108 attached to the ferrule 106 has to be fixed with respect to the light source, i.e., the laser diode 100. This can be done by fixing both the unit and the holder 102 separately, or, as shown in FIG. 2A, by using a spacer 114. The front end of the spacer 114 is attached, e.g., glued, to the antireflective coating layer 108d of the lens element 108, whereas the rear end of the spacer 114 is attached to the light source holder 102. What is meant under the term "spacer" in the present application is a an element for distancing the light source from the lens so that the aperture of the lens 110 corresponds to the entire cross section of beam. It is understood that the light spot does not have a distinct border, and therefore the term "entire cross section" means about 98% of light energy emitted from the light source.

The rear end face 106b of the ferrule 106 has butt connection to a locking ferrule 116 via a layer 118 of a UV-curable glue. The glue that forms the layer 118 is applied onto the rear end of the ferrule 106 during operation of alignment of the optical fiber 104 with the light source 100. This alignment operation will be described below. The glue also penetrates into the gap between the fiber 104 and the surface of the central opening 105 and into the opening of the locking ferrule 116. The place of butt connection is covered with a protective boot 120 made of a resilient material, e.g., rubber or plastic.

It is important to assemble the coupling of the invention shown in FIG. 2A in such a manner that the image of the light spot produced by the lens element 108 as a result of passing the light of the source 100 through the lens 110, be strictly aligned with the center of the end face 104a of the fiber 104. It is also important that the output aperture of the lens 110 corresponds to the input aperture of the fiber 104 under condition of the minimal optical losses. This condition can be fulfilled only at a predetermined position of the end face 104a of the fiber 104 with respect to the lens element 108 and with regard to specific optical characteristics of this element. For the same purpose, i.e., decrease of optical losses, the lens is made aspherical with a profile satisfying the above requirement.

The predetermined position of the end face 104a of the fiber 104 with respect to the lens element 108 is achieved as follows. The unit, consisting of the light-source holder 102 with the light source 100, the spacer 114, the lens element 108, and the ferrule 106 with the optical fiber 104 is secured in a fixture (not shown) with a photodetector 122 having a coupler for a fiber (not shown). The fiber 104 itself remains free for movements in the axial direction. The fiber is then shifted to a position in which the size of the light spot becomes minimized. This is the position in which the fiber 104 has to be fixed with respect to the lens 110. The fiber is then moved backward for a known distance, e.g., 0.5 mm with use of a micropositioner (not shown) while being observed under a microscope. A measured amount of a UV-curable glue is then applied onto the rear end face 106b of the ferrule 106 and onto the adjacent surface of the fiber clad projecting from the ferrule 106. While the glue is still in a highly fluid state, the fiber is shifted back to the adjusted position for aforementioned predetermined distance, and the front end face 116a is brought into butt contact with the rear end face 106b of the ferrule. The glue penetrates to some depth into the gaps between the fiber 104 and inner surface of the central opening 105 of the ferrule 106 and into the central opening 115 of the locking ferrule 116. The glue is UV-cured, whereby a cured glue layer 118 is formed. The rubber boot 120, which is fit onto the locking ferrule 116, is pulled onto the rear end of the ferrule 106 to protect the fiber fixation area from damage by bending. As a result, the fiber 104 is reliably fixed in the ferrules 106 and 116 in a position of optical match with the lens element 108.

Figure 2B:
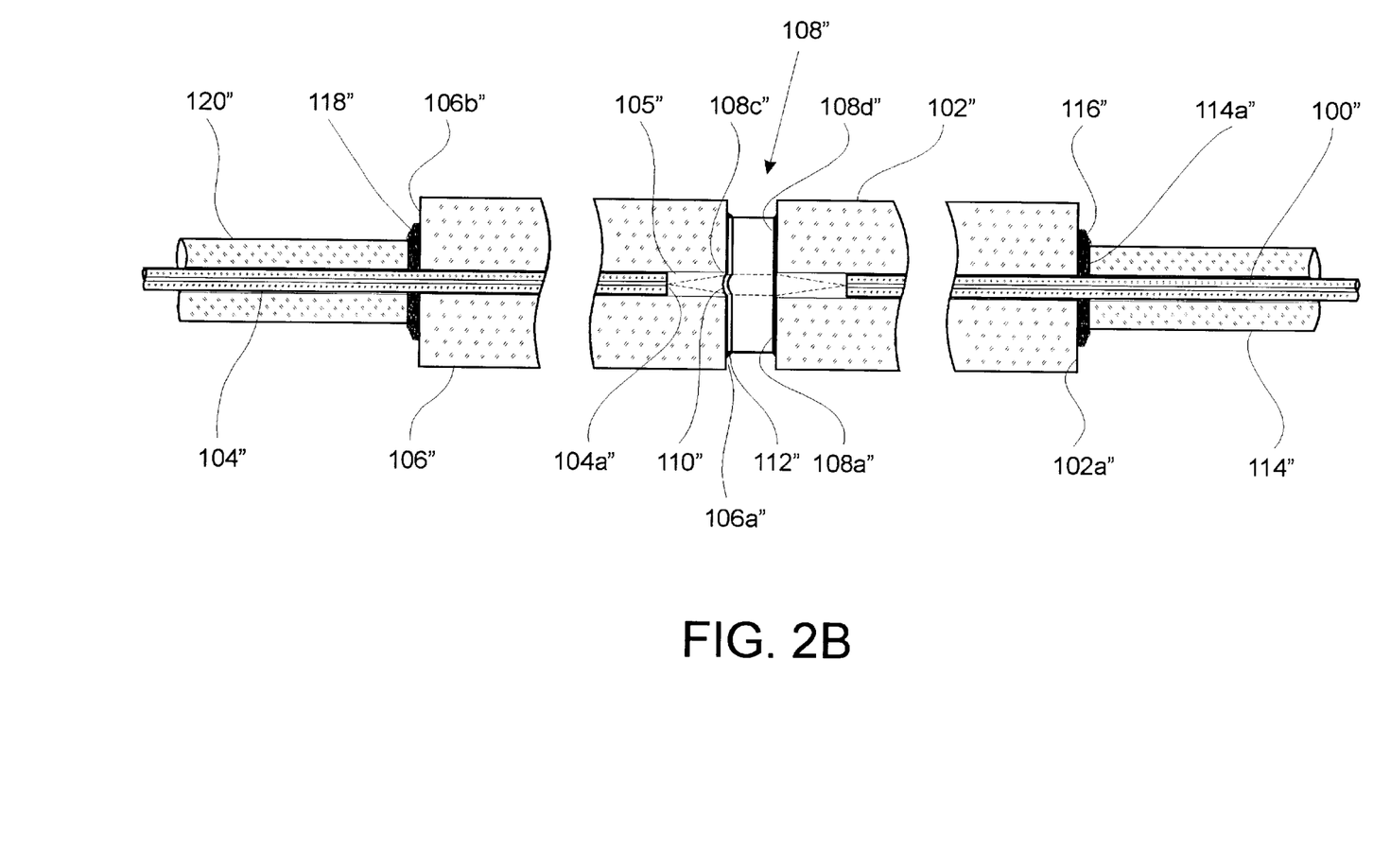
FIG. 2B is a longitudinal sectional view of a fiber-to-fiber coupling assembly of the invention.

FIG. 2B—Fiber-to-Fiber Coupling Assembly

An optical fiber-to-fiber coupling assembly of the invention is shown in FIG. 2B, which is a longitudinal sectional view of the device in accordance with another embodiment of the invention. Optical matching between the light-emitting optical components, i.e., a light-irradiating optical fiber and a light-transmitting optical fiber, is carried out with the use of an optical coupler. The purpose of the coupler is to optically match the aforementioned parts for transmitting light with minimal optical losses. In this drawing, reference numeral 100" designates a light source, e.g., an optical fiber the end of which irradiates light, generated, e.g., by a semiconductor laser (not shown in this embodiment). The light-irradiating fiber 100" is supported by a glass ferrule 102". An optical fiber 104", which has to transmit the light received from the light-irradiating optical fiber 100", is inserted with a tight sliding fit into the central opening 105" of a glass, quartz, or ceramic tube or ferrule 106". The front end face 106a" of the ferrule is strictly perpendicular to the longitudinal axis X"—X" of the ferrule 106". A plate optical lens element 108" having a circular aspheric lens 110" is attached, e.g., by a layer 112" of a UV-cured glue, to the end face 106a" of the ferrule. The base diameter of the lens 110" is equal to the diameter of the central opening 105" of the ferrule, so that the lens 110" is snugly fit into the opening 105". The front side 108a" (except for the area occupied by the lens 110", and the back side 108b" of the lens element 108" are polished to a high degree of surface finishing and are strictly parallel to each other and to the end face 106a' of the ferrule.

It is important to note that the lens 110" and the back side 108"b of the lens element are coated with antireflective coating layers 108c" and 108d", respectively.

The unit consisting of the ferrule 106" with the fiber 104" and the lens element 108" attached to the ferrule 106" has to be fixed with respect to the light-irradiating fiber 100". The front end of the ferrule 102" is attached, e.g., glued, to the antireflective coating layer 108d" of the lens element 108", whereas the rear end face 102a" of the ferrule 102" is attached to the front end face 114a of a locking ferrule 114", e.g., by a layer of a UV-curable glue 116". The end face 100a" of the light-irradiating optical fiber 100" is spaced from the lens 110" so that the aperture of the lens 110" corresponds to the entire cross section of beam. It is understood that the light spot does not have a distinct border and therefore the term "entire cross section" means about 98% of light energy emitted from the light source.

The rear end face 106b" of the ferrule 106" has butt connection to a locking ferrule 120" via a layer 118" of a UV-curable glue. The glue that forms the layer 118" is applied onto the rear end of the ferrule 106" during operation of alignment of the optical fiber 104" with the light-irradiating optical fiber 100". The glue also penetrates into the gap between the fiber 104" and the surface of the central opening 105" and into the opening of the locking ferrule 120".

It is important to assemble the coupling of the invention shown in FIG. 2B in such a manner that the image of the light spot produced by the lens element 108" as a result of passing the light of the source 100" through the lens 110", be strictly aligned with the center of the end face 104a" of the fiber 104". It is also important that the output aperture of the lens 110" corresponds to the input aperture of the fiber 104" under condition of the minimal optical losses. This condition can be fulfilled only at a predetermined position of the end face 104a' of the fiber 104" with respect to the lens element 108" and with regard to specific optical characteristics of this element. For the same purpose, i.e., decrease of optical losses, the lens is made aspherical with a profile satisfying the above requirement.

The predetermined position of the end face 104a of the fiber 104 with respect to the lens element 108 is achieved as has been described above with reference to FIG. 2A.

The coupling assemblies of the embodiments shown in FIGS. 2A and 2B make it possible to achieve coefficients of optical coupling which are close to maximal theoretical values of about 98%. This is unattainable with constructions that utilize GREEN lenses or ball lenses.

Figure 3:
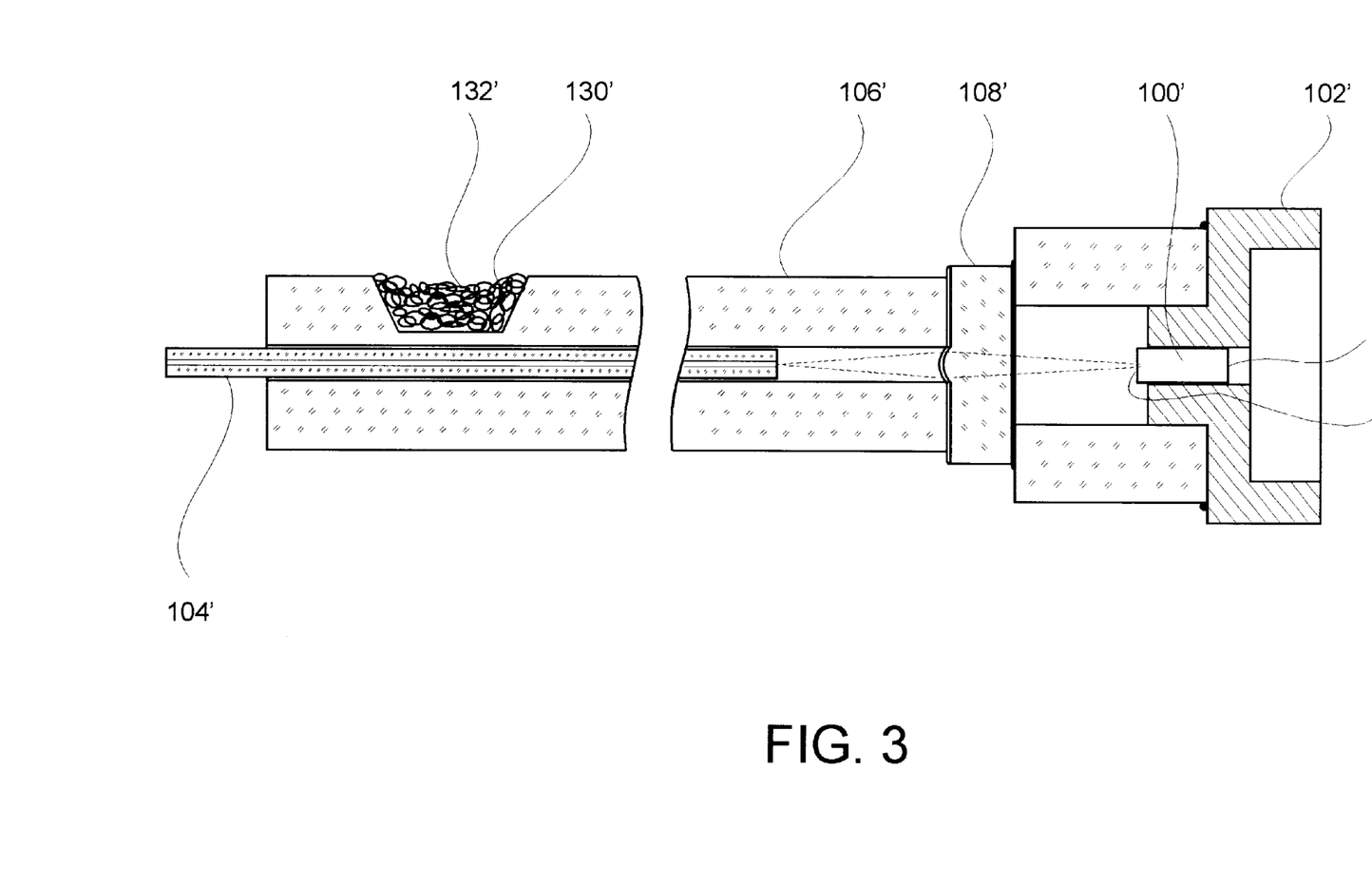
FIG. 3 is a view similar to that of FIG. 2A illustrating another method of fixation of the fiber in the adjusted position.

FIG. 3—Alternative Method for Fixation of the Fiber

FIG. 3 is a view similar to that of FIG. 2A illustrating another method of fixation of the fiber in the adjusted position. In general, this embodiment is similar to the one described with reference to FIG. 2A. The parts similar to those of FIG. 2A are designated in FIG. 3 by the same reference numerals with an addition of a prime symbol. Thus the device has a light source 100' in a light-source holder 102', etc. The embodiment of FIG. 3 differs from the embodiment of FIG. 2A in that it does not have a locking ferrule such as the locking ferrule 116 of the previous embodiment, and fixation of the fiber 104' with respect to the lens element 108' is achieved by forming a through hole 130 in the wall of the ferrule 106' which is filled with a drop of a UV-curable glue 132 added after the position of the fiber has been adjusted and has to be fixed.

Figure 4A:
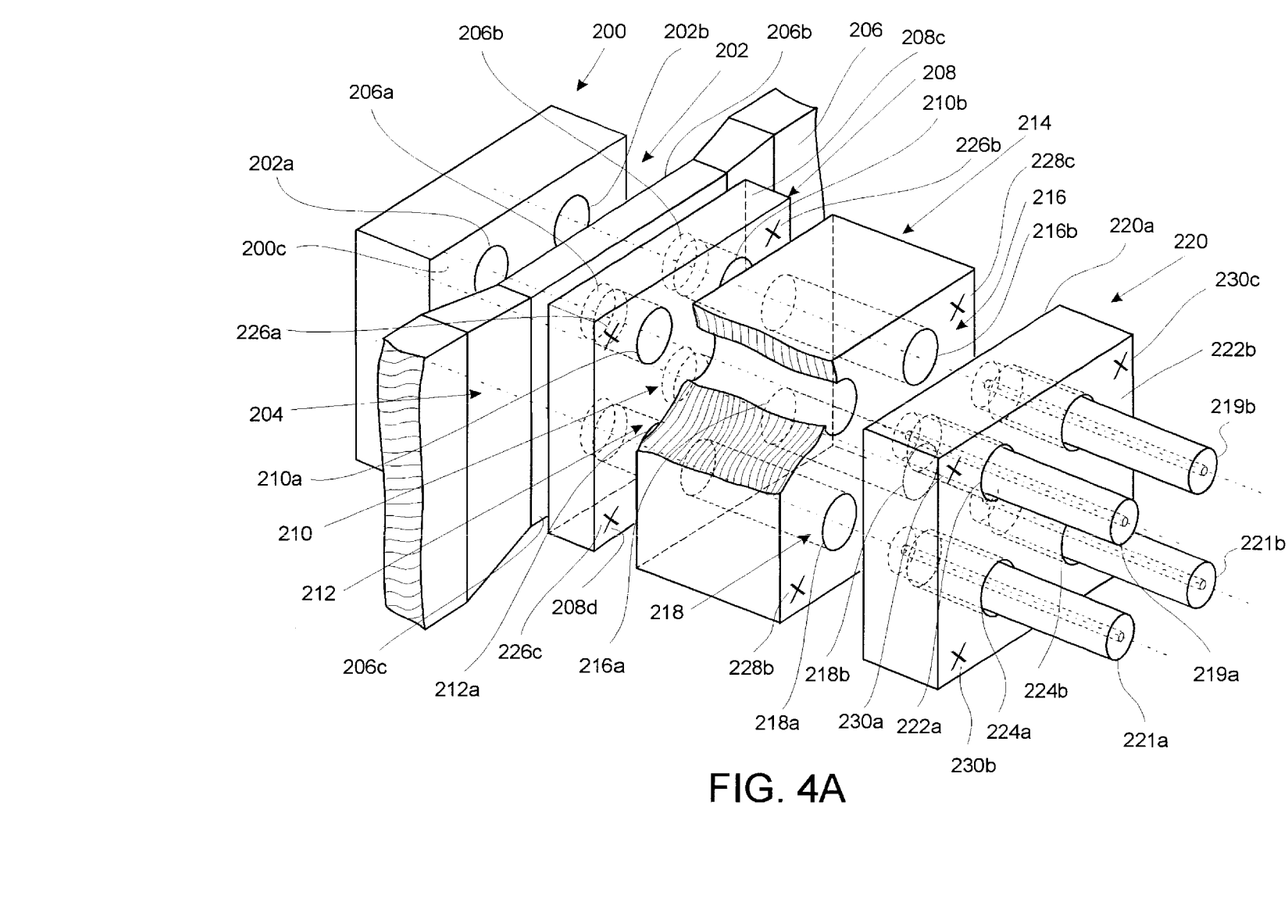
FIG. 4A is an exploded three-dimensional view illustrating assembling of a multiport coupler of the invention for coupling a laser diode matrix to a multiple-fiber port.

FIG. 4a—Device with a Multiport Coupler for Coupling a Laser Diode Matrix to a Multiple-Fiber Port FIG. 4A is an exploded three-dimensional view illustrating assembling of a multiport coupler of the invention for coupling a laser diode matrix to a multiple-fiber port. The device is suitable for mass production. The coupler consists of a light source holder 200 or a light source matrix, e.g., 32×32 VCSEL's emitter (VCSEL—Vertical Cavity Surface Emitting Laser), or a similar light diode matrix, which supports arrays 202 and 204 of light sources, such as laser diodes, respectively, only two of which, i.e., 202a, 202b can be seen in FIG. 4A. It is understood that 2×2 matrix is shown only as an example of multiplicity and that greater amount of arrays with a greater amount of diodes in each array can be used.

It is assumed that a laser diode matrix is a commercially produced unit with predetermined pitch (center to center spacing) between the emitters of individual laser diodes 202a, 202b, etc. Such diode matrices or arrays are produced, e.g., by Hitachi, Sony, Lucent, etc.

Next in the direction of propagation of light from the diodes is a spacer 206, which holds the diode matrix 200 at a distance from a microlens matrix 208 located behind the spacer 206 in the light propagation direction. It is understood that arrangement of microlenses in this matrix corresponds to the aforementioned arrangement of the diodes in the commercially produced diode matrix 200. The second important function of the spacer 206 is removal of heat from the optical elements. For this purpose, the spacer 206 is made of a dielectric material with good heat-conductive properties, such as a glassy carbon.

The spacer 206 can be made in the form of a plate with openings 206a, 206b, etc. for passing the light beams from the laser diodes 202a, 202b, etc. The spacer 206 can be made in the form of a frame.

The microlens matrix 208 is made in the form of a plate with arrays 210 and 212 of microlenses 210a, 210b and 212a, 212b, respectively. It is understood that a 2×2 microlens matrix is shown only as an example and that a larger amount of the arrays, as well as the lenses in each array, can be used.

The arrangement of the microlenses 210a, 210b and 212a, 212b in the microlens matrix 210 is strictly matched with the arrangement of the laser diodes 202a, 202b, etc., respectively, in the laser diode matrix 202. In other words, in an assembled unit, each laser diode should be strictly coaxial with the respective microlens along the respective optical axes of the system. All individual axes passing through each pair of matched laser diodes and microlenses are strictly parallel to each other.

The front end face 200c of the laser diode holder 200 (what is meant in this context under the term "front end" is a vertical plane in which the surfaces of the emitters of all laser diodes are located), the mating end face 206b and the opposite end face 206c of the spacer 206, as well as both end faces 208c and 208d of the microlens matrix 208 are strictly parallel to each other and finished to a high degree of flatness.

The next component of the assembly in the light propagation direction is a plate-like fiber termination matrix or holder 214 with arrays 216 and 218 of through openings 216a, 216b and 218a, 218b, respectively. The arrangement of these openings is strictly matched with the aforementioned patterns of laser diodes 202a, 202, etc., respectively, in the laser diode matrix 202. In other words, in an assembled unit, the longitudinal axis of each opening 216a, 216b and 218a, 218b should be strictly coaxial with the respective laser diodes 202a, 202b, etc., and with microlenses along the respective optical axes of the system.

The fiber termination holder 214 has both end faces 214a and 214b strictly parallel and finished to a high degree of flatness. The holes 216a, 216b and 218a, 218b have diameters that correspond to the base diameters of respective lenses 210a, 210b and 212a, 212b, so that when the end face 208d of the microlens matrix 208 is brought into contact with the mating end face 214a of the fiber termination holder 214, the lenses enter the respective holes with a tight fit.

The last component of the system of the invention in the direction of light propagation is the locking plate 220 which has arrays 222 and 224 of holes 222a, 222b and 224a, 224b which are coaxial to the aforementioned lenses 210a, 210b and 212a, 212b and holes 216a, 216b and 218a, 218b.

Reference numerals 219a, 219b, 221a, and 221b designate light-receiving fibers inserted into the holes 222a, 222b and 224a, 224b of the locking plate 220.

In order to ensure the aforementioned coaxiality of all respective lenses in the microlens matrix 208 with holes of the fiber termination holder 214 and of the locking plate 220, the matrix 208, the holder 214, and the locking plate 220 are manufactured with the use of a common set of photomasks (not shown) for a photolithography process. The photolithography can be used for manufacturing microlenses 210a, 210b and 212a, 212b, as well as for the openings 216a, 216b and 218a, 218b of the fiber termination holder 214 and for openings 222a, 222b, and 224a, 224b of the locking plate 220. In the stepwise manufacturing procedure, coaxiality of the lenses and respective holes is achieved due to the use of at least three alignment marks on each component, i.e., marks 226a, 226b, 226c on the microlens matrix 208, marks 228a, 228b, 228c on the fiber termination holder 214, and marks 230a, 230b, 230c on the locking plate 220. The locking plate 220 has a front end face 220a and a rear end face 220b.

The aforementioned processes of photolithography and alignment for manufacturing lens arrays and arrays of matched optical components are known in the art and described, e.g., in U.S. Pat. No. 6,055,107 issued in 2000 to Yeh-Tseng Li, et al., U.S. Pat. No. 5,997,756 issued in 1999 to Yuichi Okazaki, et al., U.S. Pat. No. 5,948,281 issued in 1999 to Yuichi Okazaki, U.S. Pat. No. 5,871,888 issued in 1999 to Paul Heremans, et al., and U.S. Pat. No. 5,867,321 issued to Ken'ichi Nakama et al.

The aforementioned microlenses and holes can be produced not necessarily by photography. For example, the holes can be ultrasonically drilled or drilled on a coordinate drilling machine of high accuracy, while microlenses can be molded from electrolytically prepared molds. However, even the case of mechanical manufacturing, marks of alignment are applied by photolithography, e.g., with the use of common mask for producing marks of alignment. Alignment holes can be pin holes.

Figure 4B:
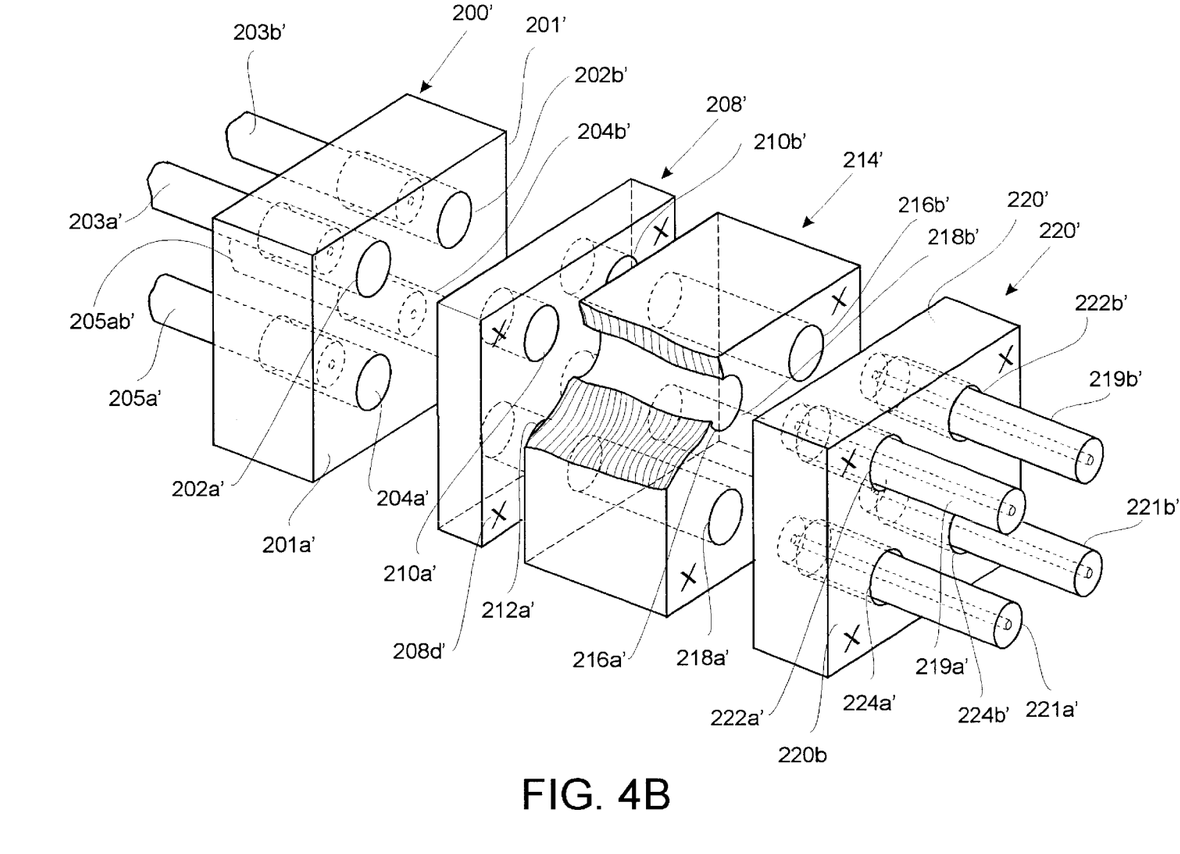
FIG. 4B is an exploded three-dimensional view illustrating a multiport coupler of the invention for coupling one multiple-fiber port to another multiple-fiber port.

FIG. 4B—Device with a Multiport Coupler for Coupling One Multiple-Fiber Port to Another Multiple-Fiber Port FIG. 4B is an exploded three-dimensional view illustrating a multiport coupler of the invention for coupling one multiple-fiber port to another multiple-fiber port. In general, the device of FIG. 4B is similar to the device of FIG. 4A and differs from it by the fact that optical coupling is carried out between two multiple-fiber ports, where one of the ports functions as a light irradiating port, while the second port functions as a light receiving port. More specifically, the device has a light-emitting multiple-fiber port 200' which comprises a plate-like body 201' with through holes 202a', 202b', 204a', and 204b' for insertion and fixation of respective light input optical fibers 203a', 203b', 205a' and 205b' which can be connected to respective light sources such as laser diodes (not shown).

The end face of respective fibers are spaced at a predetermined distance from the front end face 201a' of the plate-like body 201'. This distance functions as the spacer 206 of the device shown in FIG. 4A.

The next component in the direction of light propagation from the light-emitting multiple-fiber port 200' is a microlens matrix 208' with microlenses 210a40 , 210b', 212a', etc., formed on the front end face 208a' of the microlens matrix 208'.

Next optical component in the light propagation direction is a fiber termination holder 214' with through holes 216a', 216b' and 218a', 218b' for positioning and fixation of light-receiving fibers 219a', 219b', 221a', and 221b'.

It is understood that the respective fibers, holes, and lenses in optically coupled components of the device of FIG. 4B should coaxial and aligned. The alignment can be facilitated by using the same alignment marks that have been described in connection with the embodiment of FIG. 4A.

Figure 5:
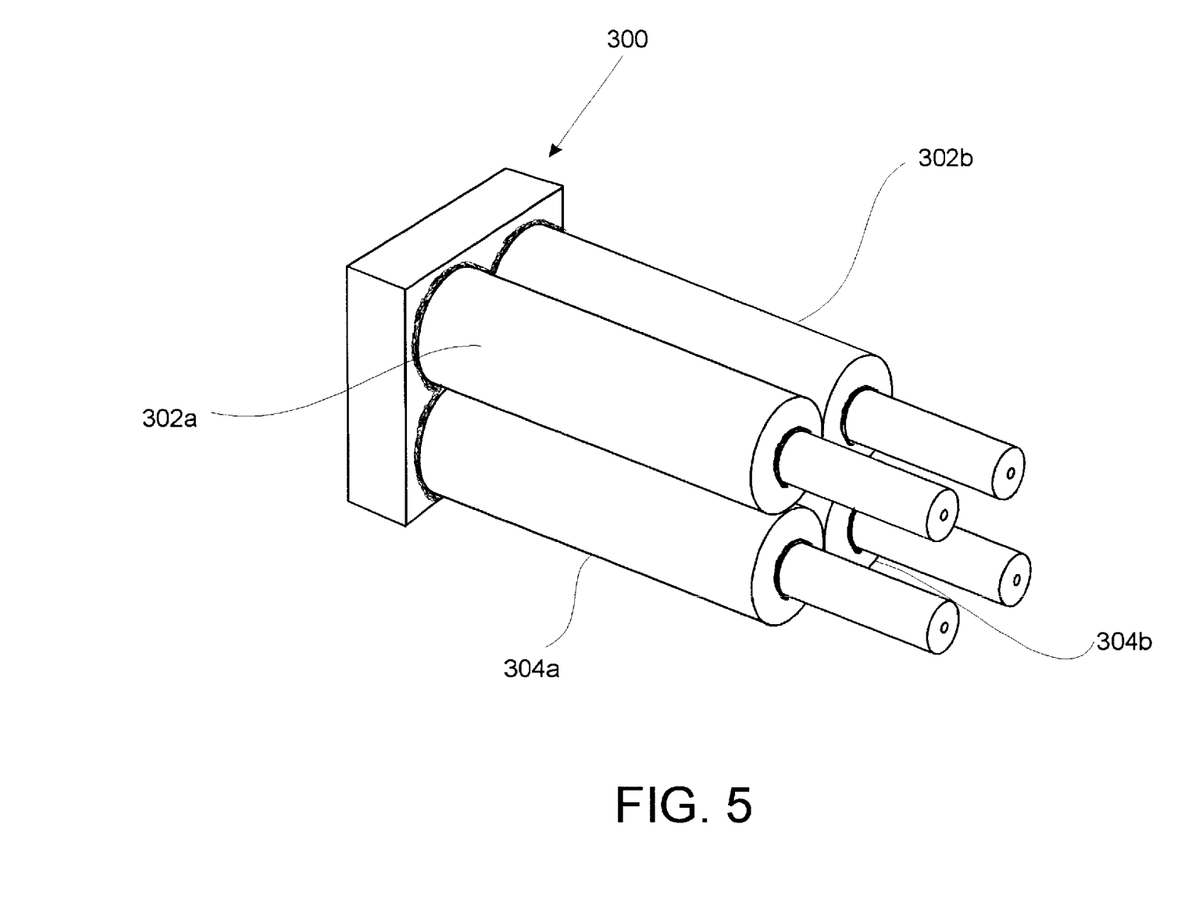
FIG. 5 is a three-dimensional view of one of the components of the couplers of FIGS. 4A and 4B made in the form of a bundle of interconnected tubes.

FIG. 5 is a three-dimensional view of a fiber termination holder 300 made in the form of a bundle of interconnected tubes 302a, 302b and 304a, 304b. The purpose and principle of use of the fiber termination holder 300 is the same as in the case of the plate-like holder 214 shown in FIG. 4A. However, the manufacturing process does not require the use of masks for photolithography, since the bundles is produced by selecting tubes of equal inner and outer diameters with subsequent tight interconnection of the tubes, e.g., by gluing, into a bundle and machining the opposite ends of the bundles.

FIGS. 4A. 4B—Assembling Procedure

If the number of fibers is small, e.g., 4 to 16, assembling of the multiport coupling unit of the type shown in FIG. 4A and 4B can be carried out in the same manner as has been described with reference to a single-fiber coupler of FIG. 2A by adjusting each fiber individually. However, under conditions d mass production or when the number of fibers exceeds 36, 64, or more, the assembling and alignment are carried out as follows.

First, the front end face of the lens termination holder 214 (214') is glued or otherwise connected to the mating end face 208d (208d') of the microlens matrix 208 (208'). Since the base diameter of the microlenses corresponds to the diameter of holes in the lens termination holder 214 (214'), the lenses will fit into these holes, and due to parallelism and flatness of the mating end faces of the holder 214 (214') and the microlens matrix 208 (208'), theses components will be aligned automatically.

The diode matrix 200 (FIG. 4A) is secured in the spacer 206, and the spacer 206 with the diode matrix is then fixed in a fixture (not shown). A sub-assembly consisting of the microlens matrix 208 (208') (FIGS. 4A and 4B) and the fiber termination holder 214 (214') is installed in a position where the microlenses are aligned with the individual laser diodes (light-emitting fibers 203a', 203b', etc.). For the case of FIG. 4A, this is achieved by bringing the spacer 206 and the diode matrix 200 in contact with each other, igniting the laser diodes, and passing the light through the holes of the aforementioned subassembly toward a light-intensity evaluating means such as, e.g., a screen or a high-resolution CCD camera (not shown) which is installed directly behind the unit. The spacer 206 or the diode matrix 200 (with the microlens matrix being already attached thereto) are then moved relative to each other by means of a micropositioner in two mutually perpendicular directions in a plane perpendicular to the light propagation direction. The adjustment is carried out while observing the image of light spots on the aforementioned screen or the CCD camera. The alignment is achieved when these spots have regular forms and uniform light intensity distribution over the images of the holes. In this position the spacer 206 is secured to the diode matrix, e.g., by a UV-curable glue. Now the subassembly consists of four aligned components, i.e., the diode matrix 200, the spacer 206, the microlens matrix 208, and the fiber termination holder 214.

In the case of the embodiment of FIG. 4B, the alignment procedure is the same, but manipulations are performed with the multiple-fiber port 200', and the light emitted from the ends of the fibers 203a', 203b', etc., is generated by the laser diode which are not shown in FIG. 4B. the ends of these fibers are fixed in the holes 202a', 202b', etc., of the plate 201'.

The next assembling step is insertion, aligning, and fixation of individual fibers 219a, 219b (219a', 219b'), and 221a, 221b (221a, 221b') in positions optically matched with respective diodes (light-emitting fibers), lenses, and holes. For this purpose, optical fibers 219a, 219b (219a', 219b'), and 221a, 221b (221a', 221b') are passed through the holes 222a, 222b and 224a, 224b (222a', 222b' and 224a', 224b') to protrude for a distance, which approximately is equal to the thickness of the fiber termination holder 214 (214'). A plate (not shown) is then installed in front of the fiber ends strictly parallel to the front end face 220a (220a') of the locking plate 220 (220'). The fibers are shifted forward to contact the aforementioned plate, whereby after removal of the plate, the ends of the fiber are located strictly in one plane and at an equal distance from the microlenses. The fiber are the fixed to the locking plate 220 (220') by glue applied to the rear end face 220b (220b') of the locking plate 220 (220'). The unit of the plate 220 (220') with fibers is moved towards the fiber termination holder 214(214') so that the ends of the fibers 219a, 219b (219a', 219b'), and 221a, 221b (221a', 221b') are tightly fitted into the respective openings 216a, 216b (216a', 216b') and 218a, 218b (218a', 218b') of the holder 214 (214').

The alignment and optical matching of the fibers 219a, 219b (219a', 219b'), and 221a, 221b (221a', 221b') with respect to the microlenses 210a, 210b (210a', 210b') and 212a, 212b (212a', 212b') is achieved by installing a screen or high-resolution CCD's at the rear ends of the fibers. The laser diodes are then ignited, the light passes through the microlenses, is transmitted through the fibers, and is projected onto the aforementioned screen or CCD's. The adjustment is carried out by shifting the ends of the fibers 219a, 219b (219a', 219b'), and 221a, 221b (221a', 221b') with respect to the microlenses 210a, 210b (210a', 210b') and 212a, 212b (212a', 212b'). The maximum of the light signals on the receiving end is used for defining the final position of the fiber ends. After the positioning is completed, the sub-assembly consisting of the locking plate 220 (220') with the fibers is moved away from the rest of the unit for a known distance, e.g., of 0.5 mm. The space between the components is filled with a UV-curable glue, and the aforementioned sub-assembly is returned to the adjusted position for fixing the components by curing the glue.

Figures 6A, 6B:
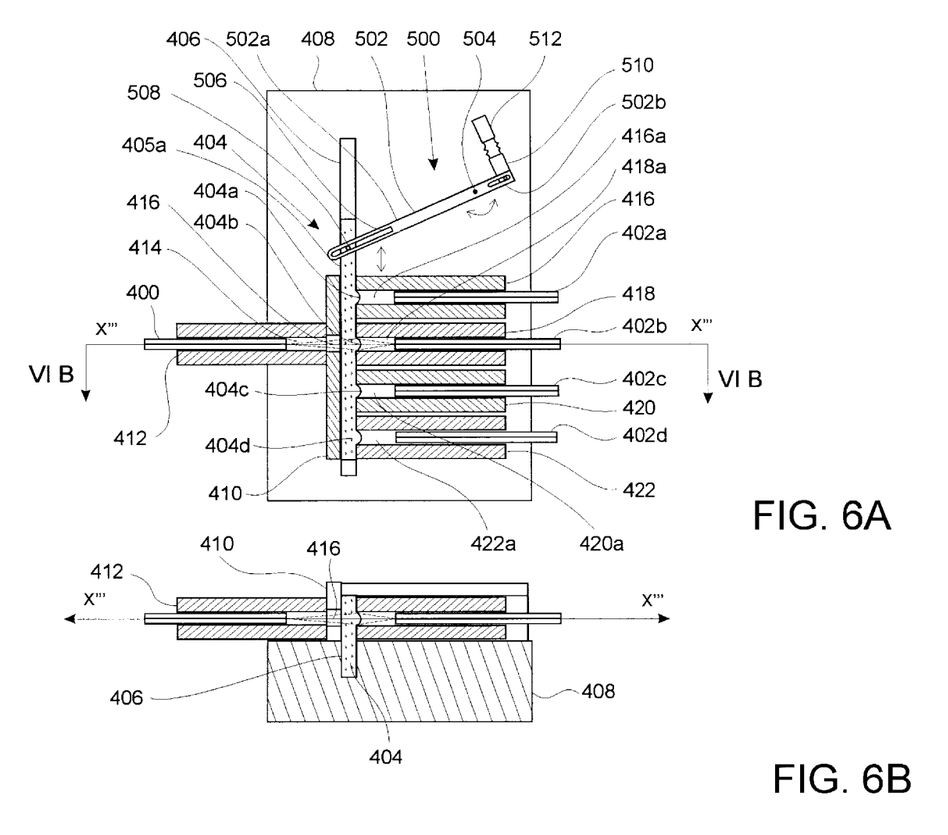
FIG. 6A is a plan view of a device for switching an optical path between optical fibers.
FIG. 6B is a sectional view along lines VIB—VIB in FIG. 6A.

FIGS. 6A and 6B—Device for Switching an Optical Path Between Input and Output Fibers FIGS. 6A and 6B illustrate an embodiment of the device of the invention with means for switching an optical path between an input optical fiber 400 and a four output optical fibers 402a, 402b, 402c, and 402d. It is understood that one input optical fiber and four output optical fibers are shown only as an example, since switching can be performed between groups of fibers on the input and output sides, or between one input and two output fibers. FIG. 6B is a sectional view along lines VIB—VIB in FIG. 6A.

The basic element of the device of FIGS. 6A and 6B is a linear array 404 of microlenses 404a, 404b, 404c, and 404d. The array 404 is slidingly fitted into a guide slot 406 formed in a housing 408 in a direction perpendicular to the optical axis X'"—X'" of the device. Continuation of one wall of the guide slot 406 in the vertical direction is formed by a spacer 410 in the form of a plate rigidly attached to the housing 408. An end face of a ferrule 412 is attached to the spacer 410 on the side opposite to the array 404. A central hole 414 of the ferrule and a hole 416 of the spacer 410 coaxial to the hole 414 and having the same diameter are used for insertion and fixation of the light input fiber 400. The end face of the fiber 400 is spaced from the flat end face 405a of the array 404 at a predetermined distance determined in accordance with the same principle as has been described above with respect to positioning the end faces of fibers 100" and 104" (FIG. 2B).

The microlenses 404a, 404b, 404c, and 404d are inserted with tight fit into through openings 416a, 418a, 420a, and 422a of respective ferrules 416, 418, 412, and 422 which are axially aligned with the optical axes of the respective microlenses. The end faces of the ferrules 416, 418, 412, and 422 are attached, e.g., with the use of a UV-curable glue, to the lens side of the microlens array 404.

Inserted into the ferrule opening 416a, 418a, 420a, and 422a from the side opposite to the microlenses are output optical fibers 402a, 402b, 402c, and 402d.

The end faces of the output optical fibers 402a, 402b, 402c, and 402d are spaced from the respective microlenses 404a, 404b, 404c, and 404d in accordance with the same principle that was used for distancing the end face 104a" from the microlens 110" in the device of FIG. 3.

The array 406 is attached to a micropositioning mechanism 500 which consist of a lever 502 rotating on a pivot pin 504. The long arm 502a of the lever 502 has a longitudinal slot 506 for sliding a pin 508 attached to the array 406. The opposite short arm 502b of the lever 502 is attached to an actuating member 510 of a stepper micropositioner 512, such as piezotransducers produced by Polytec Co., USA.

In operation, activation of the micropositioner 512 causes sequential or programmed switching of the array 404 so that a selected output optical fiber of the group consisting of optical fibers 402a, 402b, 402c, and 402d is aligned and optically coupled with the input optical fiber 400.

Thus, it has been shown that the invention provides an optical fiber coupler, which is simple in construction, easy to align in assembling under conditions of mass production, and is suitable for use in optical fiber multiport couplers. The invention also provides a method of manufacturing and assembling an optical coupler for coupling an optical fiber with an optical component, which is simple and is suitable for mass production.

Although the invention has been shown and described with reference to specific embodiments, it is understood that these embodiments should not be construed as limiting the application of the invention and that any changes and modifications are possible, provided they do not depart from the scope of the appended claims. For example, in the multiport embodiment, the lens elements may have a square, hexagonal or any other suitable configuration. The optical system component that is connected to an optical fiber by the coupling device of the invention may not necessarily be a light source at all and may comprise, e.g., the end of another light-irradiating optical fiber. The optical components can be attached to each other by thermal fusion instead of gluing. The spacer is not necessarily made as a separate part and may be an extension of the lens element that projects from the front end face of this element towards the laser diode holder. Similarly, the spacer can be an integral part of the laser diode holder. The spacer length can be adjustable. It is understood that the linear array 404 of the embodiment of FIGS. 6A and 6B can be replaced by a matrix of microlenses so that switching can be performed in the direction of two orthogonal axes. The switching can be performed by a mechanism different from the one shown in FIGS. 6A and 6B, e.g., with the use of MEMS (micro-electro-mechanical systems). The microswitch can be connected to the light input element or elements instead of light output optical fibers. The microswitch can be used for switching the light components on and off or for switching between the components.

What is claimed is:

1. An optical fiber/optical component assembly, comprising:
   at least one light-emitting optical component;
   at least one light-transmitting optical fiber having a longitudinal axis; and
   at least one optical coupler between said at least one light-emitting optical component and said at least one light-transmitting optical fiber for optically matching said at least one light-emitting optical component with said at least one light-transmitting optical fiber;
   said at least one optical coupler comprising:
   a plate-like lens element having a front end face and a rear end face with a circular lens on said rear end face, said circular lens having an optical axis coaxial with said longitudinal axis of said at least one light-transmitting optical fiber and having an aperture, said front end face and said rear end face being strictly parallel to each other and are machined to a high degree of flatness;
   a fiber termination holder for holding one end of said light-transmitting optical fiber with a through central opening into which said one end of said light-transmitting optical fiber is moveably inserted with a tight fit, said through opening having a diameter equal to a diameter of said circular lens;
   a spacer for distancing said light-emitting optical component from said plate-like lens element for a distance at which said aperture of said circular lens correspond substantially to the entire cross section of a light beam emitted from said light-emitting optical component; and
   a fiber locking element with means for the fixation of said light-transmitting optical fiber to said fiber termination holder in a position, in which said light-emitting optical component is optically matched to said light-transmitting optical fiber for transmitting maximum light energy.

2. The assembly of claim 1, further provided with means for switching said at least one light-transmitting optical fiber between a first position, in which said at least one light-transmitting optical component is coupled to said at least one light-emitting fiber, and a second position, in which said at least one light-transmitting optical fiber is out of optical coupling to said at least one light-emitting optical fiber.

3. The assembly of claim 2, wherein said at least one light-emitting optical component is a light-irradiating optical fiber.

4. The assembly of claim 3, wherein said at least one fiber termination holder has a front end face and rear end face which are strictly parallel to each other and to said one end of said light-transmitting optical fiber, said front end face of said at least one fiber termination holder being machined to a high degree of flatness and is strictly parallel to said rear end face of said at least one plate-like optical element, so that when said circular lens is inserted into said through opening, said at least one plate-like element, said at least one fiber termination holder, and said at least one light-transmitting fiber are self-aligned in a direction perpendicular to said longitudinal axis.

5. The assembly of claim 1, further comprising:
   a plurality of said light-transmitting optical fibers;
   an array of said circular lenses on said plate-like lens element, each said circular lenses of said array being optically coupled to a respective light-transmitting optical fiber of said plurality; and
   a multiple position means for switching said plurality of said light-transmitting optical fibers together with said circular lenses between multiple positions, in which any one of said plurality of said light-transmitting optical fibers can be optically coupled to said light-emitting optical component.

6. The assembly of claim 5, wherein said means for switching comprises a micropositioner connected to said array of circular lenses.

7. The assembly of claim 5, wherein said at least one light-emitting optical component is a light-irradiating optical fiber, said means for switching comprises a micropositioner connected to said array of circular lenses.

8. The assembly of claim 1, wherein said at least one light-emitting optical component is a light-irradiating optical fiber, said spacer being made of a material with high coefficient of heat conductivity for functioning as heat-removing means.

9. The assembly of claim 1, wherein said at least one light-emitting optical component is an axisymmetric laser diode, said spacer being made of a material with high coefficient of heat conductivity for functioning as heat-removing means.

10. The assembly of claim 9, wherein said at least one fiber termination holder has a front end face and rear end face which are strictly parallel to each other and to said one end of said light-transmitting optical fiber, said front end face of said at least one fiber termination holder being machined to a high degree of flatness and is strictly parallel to said rear end face of said at least one plate-like optical element, so that when said circular lens is inserted into said through opening, said at least one plate-like element, said at least one fiber termination holder, and said at least one light-transmitting fiber are self-aligned in a direction perpendicular to said longitudinal axis.

11. The assembly of claim 10, wherein said at least one light-transmitting optical fiber, said at least one lens element, and said at least one fiber termination holder are made of materials with substantially the same coefficient of thermal expansion.

12. The assembly of claim 11, wherein at least one end face of said at least one lens element has an anti-reflecting coating.

13. The assembly of claim 12, wherein at least one end face of said at least one lens element has an anti-reflecting coating.

14. The assembly of claim 10, wherein said one end of said at least one light-transmitting fiber has an anti-reflecting coating.

15. The assembly of claim 10, wherein at least one end face of said at least one lens element has an anti-reflecting coating.

16. The assembly of claim 9, further comprising at least one fiber locking element for locking said at least one light-transmitting fiber to said fiber termination holder in said optically matched position.

17. The assembly of claim 16, wherein said at least one fiber locking element comprises a tubular body with a central hole having a diameter that ensures a loose fit of said light-transmitting optical fiber in said central hole of said tubular body and a layer of a UV-curable glue between the rear end face of said fiber termination holder and said tubular body.

18. The assembly of claim 16, further comprising a boot of a resilient material fit onto said at least one fiber locking element and onto said at least one fiber termination holder over said layer of said UV-curable glue.

19. The assembly of claim 16, wherein said at least one fiber locking element comprises at least one through hole in the walls of said at least one fiber termination holder filled with a glue that fixes said at least one light-transmitting fiber to said at least one fiber termination holder.

20. The assembly of claim 1, wherein said at least one light-transmitting optical fiber, said at least one lens element, and said at least one fiber termination holder are made of materials with substantially the same coefficient of thermal expansion.

21. The assembly of claim 1, wherein said one end of said at least one light-transmitting fiber has an anti-reflecting coating.

22. The assembly of claim 1, wherein at least one end face of said at least one lens element has an anti-reflecting coating.

23. The assembly of claim 1, wherein said at least one light-emitting optical component, at least one light-transmitting optical fiber; and at least one optical coupler are contained in equal quantities.

24. An optical fiber/optical component assembly, comprising:
an optical component matrix with a plurality of light-emitting optical components;
a plurality of light-transmitting optical fibers, each having an optical axis, which coincides, with a respective optical axis of each of said light-emitting optical components of said plurality of light-emitting optical components; and a multiport optical coupler between said optical component matrix and said plurality of light-transmitting optical fibers for optically matching each of said optical light-emitting component of said plurality of light-emitting optical components with each respective light-transmitting optical fiber of said plurality of light-transmitting optical fibers;
said optical coupler comprising:
a lens element matrix having a front end face and a rear end face and a plurality of circular lenses, each having an optical axis that coincides with a respective optical axis of each of said light-transmitting fibers and of each of said optical light-emitting components, each said circular lens of said plurality has an aperture, said front end face and said rear end face of said lens element matrix being strictly parallel to each other and is machined to a high degree of flatness;
a fiber termination matrix for holding one end of each light-transmitting fiber of said plurality, said fiber termination matrix having a plurality of through openings which are coaxial to said optical axes and into which said one end of said each of said light-transmitting optical fibers is moveably inserted with a tight fit, each of said through openings having a diameter equal to a diameter of each of said respective circular lenses;
a spacer for distancing said optical component matrix from lens element matrix for a distance at which said aperture of each of said circular lenses corresponds substantially to the entire cross section of a light beam emitted from each of said light-emitting optical components on each of said circular lenses; and
a fiber locking matrix with means for the fixation of each of said light-transmitting optical fibers to said fiber termination matrix in a position, in which each of said light-emitting optical components is optically matched to each of said light-transmitting optical fibers for transmitting maximum light energy.

25. The assembly of claim 24, wherein each of said light-emitting components is a laser diode with axisymmetric radiation.

26. The assembly of claim 25, wherein said light-transmitting optical fibers, said lens element matrix, and said fiber termination matrix are made of materials with substantially the same coefficient of thermal expansion.

27. The assembly of claim 24, wherein each of said light-emitting optical components is an axisymmetric laser diode, said means for the fixation of each of said light-transmitting fibers to said fiber termination matrix is a UV-curable glue.

28. The assembly of claim 24, wherein said fiber termination matrix has a front end face and rear end face which are strictly parallel to each other and to said one end of each of said light-transmitting optical fibers, said front end face of said fiber termination matrix being machined to a high degree of flatness and is strictly parallel to said rear end face of said optical lens matrix, so that when each of said circular lenses of said plurality of circular lenses is inserted into each of said plurality of through openings, said lens element matrix, said fiber termination matrix, and each of said plurality of light-transmitting fibers are self-aligned in a direction perpendicular to said optical axes.

29. The assembly of claim 28, further comprising a fiber locking matrix for locking each of said light-transmitting fibers to said fiber termination matrix in said position, in which each of said light-emitting optical components is optically matched with each respective light-transmitting optical fiber of said plurality.

30. The assembly of claim 29, wherein said fiber locking matrix comprises a plate with a plurality of holes having longitudinal axes coinciding with said optical axes and each having a diameter that ensures a loose fit of each respective light-transmitting optical fibers of said plurality of said light-transmitting optical fibers in said holes of said plate, and a layer of a UV-curable glue between said rear end face of said fiber termination matrix and said plate.

31. The assembly of claim 24, wherein said light-transmitting optical fibers, said lens element matrix, and said fiber termination matrix are made of materials with substantially the same coefficient of thermal expansion.

32. The assembly of claim 24, wherein said one end of each of said light-transmitting fibers has an anti-reflecting coating.

33. The assembly of claim 32, wherein at least one end face of said lens element matrix has an anti-reflecting coating.

34. The assembly of claim 24, wherein at least one end face of said lens element matrix has an anti-reflecting coating.

35. A method of manufacturing and assembling an optical component/optical fiber assembly, comprising:
   providing a light-emitting optical component and a light-transmitting optical fiber, said light-emitting optical component having an optical axis, said light-transmitting optical fiber having a longitudinal optical axis;
   providing a fiber termination holder with a front end face and a rear end face for holding one end of said light-transmitting fiber, said fiber termination holder having an opening for movably fitting said light-transmitting optical fiber into said opening from said rear end of said fiber termination holder with a tight fit, said opening having a diameter and a longitudinal axis;
   providing a optical lens element with a front end face and a rear end face, said rear end face of said lens element having a circular lens of a diameter equal to said diameter of said opening;
   processing said front end face and said rear end face of said fiber termination holder, as well as said front end face and said rear end face of said lens element to high degree of parallelism and flatness;
   inserting said circular lens into said opening of said fiber termination holder from said front end face of said fiber termination holder until said rear end face of said optical lens element comes into contact with said front end face of said fiber termination holder, thus aligning said circular lens with said longitudinal axis of said opening with automatic self-aligning of said optical lens element with said opening in direction perpendicular to said longitudinal axis;
   fixing said optical lens element to said fiber termination holder;
   providing a spacer between said front end face of said optical lens element and said light-emitting optical component;
   distancing said light-emitting optical component from said circular lens with the use of said spacer to a position, in which an aperture of said circular lens was substantially equal to a cross of a light beam emitted from said light-emitting optical component onto said circular lens;
   fixing said light-emitting optical component with respect to said circular lens in said position;
   inserting said one end of said light-transmitting optical fiber into said opening from the side of said rear end face of said fiber termination holder to a position in which said light-emitting optical component is optically matched to said light-transmitting optical fiber for transmitting maximum light energy;
   fixing said light-transmitting optical fiber to said fiber termination holder in said optically matched position.

36. The method of claim 35, further comprising the step of applying an anti-reflective coating onto said circular lens prior to insertion of said lens into said opening.

37. The method of claim 36, further comprising the step of applying an anti-reflective coating said front end face of said fiber termination holder.

38. The method of claim 35, further comprising the step of applying an anti-reflective coating said front end face of said fiber termination holder.

39. The method of claim 35, wherein said step of distancing comprises:
   providing a fiber locking holder having an opening into which said light-transmitting optical fiber can be inserted with a loose fit;
   said step of inserting said light-transmitting optical fiber into said fiber termination holder is carried out by first passing said light-transmitting optical fiber through said opening of said fiber locking holder;
   igniting said light-emitting optical component;
   installing a light-intensity evaluating means behind the end of said fiber opposite to said light-emitting optical component;
   shifting said light-transmitting optical fiber in said opening of said fiber termination holder while observing the intensity of light by means of said light-intensity evaluation means;
   registering a position of said light-transmitting optical fiber, which corresponds to said position of maximum light energy;
   moving said light-transmitting optical fiber from said position in a direction away from said light-emitting optical component for a known distance;
   applying an adhesive onto said rear end face of said fiber termination holder;
   and fixing said light-transmitting fiber to said fiber termination holder by returning said light-transmitting fiber to said registered position and bringing said fiber locking holder into contact with said rear end face of said fiber termination holder.

40. The method of claim 39, wherein said adhesive is a UV-curable glue.

41. A method of manufacturing and assembling an optical component/optical fiber assembly, comprising:
   providing a matrix with a plurality of light-emitting optical components and a plurality of light-transmitting optical fibers, each one of said light-emitting optical components corresponding to each one of said light-transmitting fibers, each of said light-emitting optical components having an optical axis, each of said light-transmitting optical fibers having a longitudinal optical axis;

providing a fiber termination matrix having a front end face and a rear end face for holding one end of each of said light-transmitting fibers, said fiber termination matrix having a plurality of openings for movably fitting each of said light-transmitting optical fibers into a respective opening of said plurality of said openings from said rear end of said fiber termination matrix with a tight fit, said openings having the same diameter and a longitudinal axes;

providing a lens matrix with a front end face and a rear end face, said rear end face of said lens matrix having a plurality of circular lenses of a diameter equal to said diameter of said openings;

processing said front end face and said rear end face of said fiber termination matrix, as well as said front end face and said rear end face of said lens matrix to a high degree of parallelism and flatness;

inserting said circular lenses into said openings of said fiber termination matrix from said front end face of said fiber termination matrix until said rear end face of said lens matrix comes into contact with said front end face of said fiber termination matrix, thus aligning each of said circular lens with said longitudinal axis of each of said openings with automatic self-aligning of each of said circular lens with each of said openings in a direction perpendicular to said longitudinal axis of each of said openings;

attaching said lens matrix to said fiber termination matrix;

providing a spacer between said front end face of said lens matrix and said optical component matrix;

distancing said optical component matrix from said lens matrix with the use of said spacer to a position, in which an aperture of each of said circular lenses is substantially equal to a cross section of a light beam emitted from each of said light-emitting optical components onto each respective circular lens;

fixing said optical component matrix with respect to said lens matrix in said position;

inserting said one end of each of said light-transmitting optical fibers into each of said openings from the side of said rear end face of said fiber termination matrix to a position in which each of said light-emitting optical components is optically matched to each respective light-transmitting optical fiber for transmitting maximum light energy;

fixing said light-transmitting optical fibers to said fiber termination matrix in said optically matched position.

42. The method of claim 41, further comprising the step of applying an anti-reflective coating onto said rear end face of said lens matrix, including the surfaces of said circular lenses, prior to insertion of said circular lenses into said respective openings.

43. The method of claim 41, further comprising the step of applying an anti-reflective coating onto said front end face of said fiber termination matrix.

44. The method of claim 41, further comprising the step of applying an anti-reflective coating onto said front end face of said fiber termination matrix.

45. The method of claim 41, wherein said step of distancing comprises:

providing a fiber locking plate having a plurality of openings into which said plurality of light-transmitting optical fibers can be inserted with a loose fit;

said step of inserting said light-transmitting optical fibers into said fiber termination matrix is carried out by first passing said light-transmitting optical fibers through said plurality of openings of said fiber locking plate;

igniting said light-emitting optical components;

installing a light-intensity evaluating means behind the end of said light-transmitting fiber opposite to said light-emitting optical components;

shifting said light-transmitting optical fibers in said openings of said fiber termination matrix while observing the intensity of light by means of said light-intensity evaluation means;

registering a position of said light-transmitting optical fibers, which corresponds to said position of maximum light energy;

moving said light-transmitting optical fibers from said position in a direction away from said light-emitting optical components for a known distance;

applying an adhesive onto said rear end face of said fiber termination matrix;

and fixing said light-transmitting fibers to said fiber termination matrix by returning said light-transmitting fibers to said registered position and bringing said fiber locking plate into contact with said rear end face of said fiber termination matrix.

46. The method of claim 45, wherein said adhesive is a UV-curable glue.

\* \* \* \* \*